(12) United States Patent
Horita

(10) Patent No.: US 10,560,131 B2
(45) Date of Patent: Feb. 11, 2020

(54) FRONT-END MODULE AND COMMUNICATION DEVICE

(71) Applicant: Murata Manufacturing Co., Ltd., Nagaokakyo-shi, Kyoto-fu (JP)

(72) Inventor: Atsushi Horita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/378,669

(22) Filed: Apr. 9, 2019

(65) Prior Publication Data

US 2019/0326938 A1 Oct. 24, 2019

(30) Foreign Application Priority Data

Apr. 20, 2018 (JP) ................................ 2018-081061

(51) Int. Cl.
*H04B 1/00* (2006.01)
*H04B 1/18* (2006.01)

(52) U.S. Cl.
CPC ............... *H04B 1/006* (2013.01); *H04B 1/18* (2013.01)

(58) Field of Classification Search
CPC combination set(s) only.
See application file for complete search history.

(56) References Cited

U.S. PATENT DOCUMENTS

| 9,853,614 | B2* | 12/2017 | Wang | H03F 1/565 |
| 2015/0214985 | A1* | 7/2015 | Lee | H04B 1/0053 |
| | | | | 455/77 |
| 2015/0295596 | A1 | 10/2015 | Wloczysiak et al. | |
| 2016/0126990 | A1* | 5/2016 | Leipold | H04W 72/04 |
| | | | | 370/329 |
| 2018/0062582 | A1* | 3/2018 | Pehlivanoglu | H03F 3/211 |

FOREIGN PATENT DOCUMENTS

| JP | 2004-281847 A | 10/2004 |
| JP | 2006-279604 A | 10/2006 |
| JP | 2015-023557 A | 2/2015 |
| JP | 2015-204629 A | 11/2015 |

\* cited by examiner

*Primary Examiner* — Junpeng Chen
(74) *Attorney, Agent, or Firm* — Keating & Bennett, LLP

(57) ABSTRACT

A front-end module includes a substrate, and a receiving circuit that is provided in or on the substrate and in which CA is executed. The receiving circuit includes a first filter, a first inductor, and a first LNA disposed on a first path, and a second filter, a second inductor, and a second LNA disposed on a second path. A coil axis of the first inductor and a coil axis of the second inductor are different from each other.

22 Claims, 13 Drawing Sheets

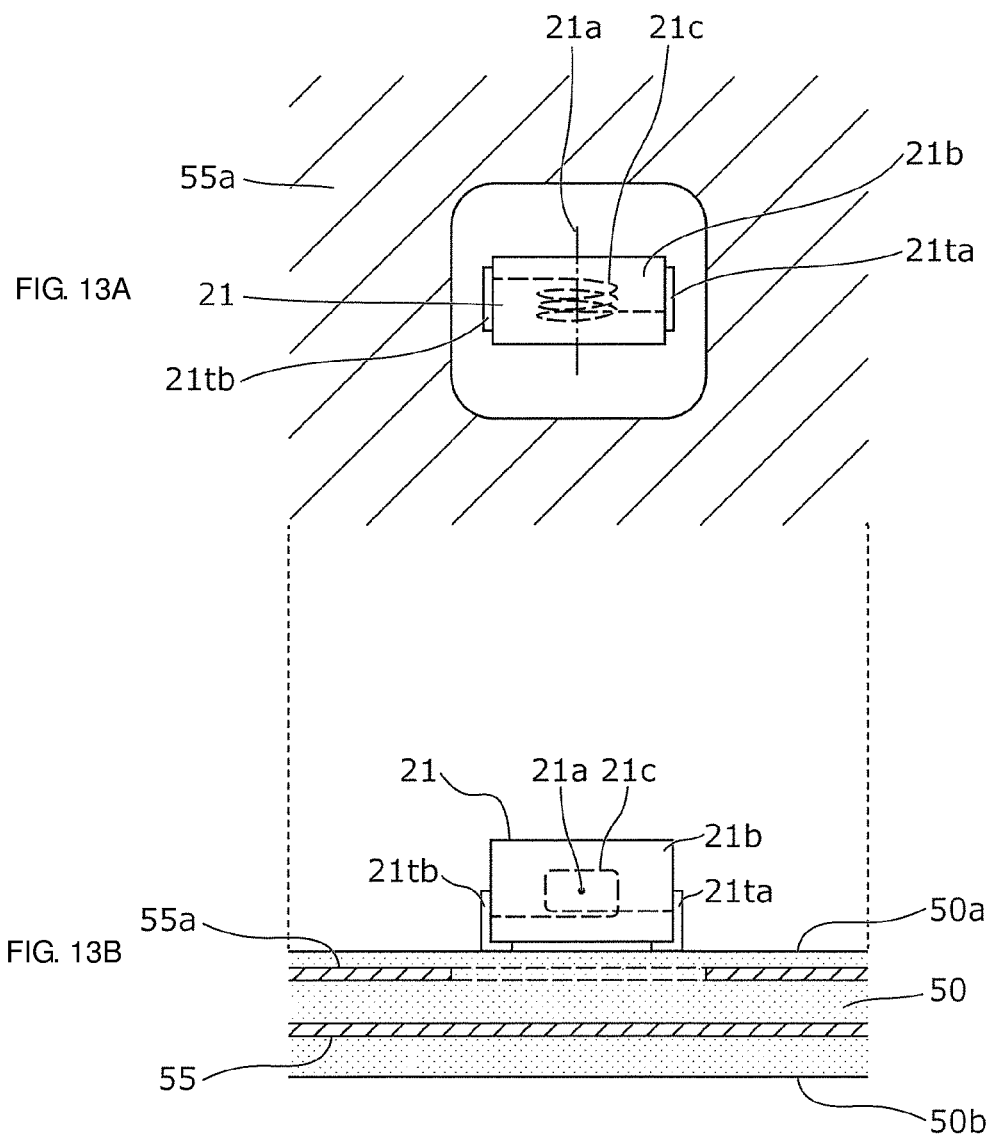

FRONT-END MODULE AND COMMUNICATION DEVICE

CROSS REFERENCE TO RELATED APPLICATION

This application claims the benefit of priority to Japanese Patent Application No. 2018-081061 filed on Apr. 20, 2018. The entire contents of this application are hereby incorporated herein by reference.

BACKGROUND OF THE INVENTION

1. Field of the Invention

The present invention relates to a front-end module including a receiving circuit in which carrier aggregation (CA) is executed, and a communication device.

2. Description of the Related Art

Recently, high integration of a front-end module including a receiving circuit in which CA is executed has been advancing. As an example of such a front-end module, FIG. 8 of Japanese Unexamined Patent Application Publication No. 2015-23557 discloses a front-end module including a plurality of filters, and a plurality of low noise amplifiers (LNAs) connected in a one to one manner to the plurality of filters.

In a front-end module, a matching inductor for performing impedance matching for a filter and an LNA is generally provided between the filter and the LNA. Although a plurality of the matching inductors are provided to correspond to a plurality of the filters and a plurality of the LNAs, there is a problem that, along with increasing the degree of circuit integration of the front-end module, when CA is executed, the matching inductors electromagnetically couple with each other, and characteristics of the front-end module deteriorate.

SUMMARY OF THE INVENTION

Preferred embodiments of the present invention provide front-end modules each including a receiving circuit on which the CA is executed, to prevent electromagnetic field coupling among matching inductors for matching a filter and an LNA, and to prevent characteristic deterioration in the front-end modules.

A front-end module according to a preferred embodiment of the present invention includes a substrate, and a receiving circuit that is provided in or on the substrate and in which CA is executed, in which the receiving circuit includes a first path and a second path to which a high-frequency signal is inputted when the CA is executed, a first filter disposed on the first path and filtering the high-frequency signal, a first low noise amplifier (LNA) disposed on the first path and amplifying a signal filtered by the first filter, a first inductor provided on the first path between the first filter and the first LNA and performing impedance matching for the first filter and the first LNA, a second filter disposed on the second path and filtering the high-frequency signal, a second LNA disposed on the second path and amplifying a signal filtered by the second filter, and a second inductor provided on the second path between the second filter and the second LNA, and performing impedance matching for the second filter and the second LNA, and a coil axis of the first inductor and a coil axis of the second inductor are different from each other.

In addition, a communication device according to a preferred embodiment of the present invention includes a front-end module according to a preferred embodiment of the present invention, and a signal processing circuit that processes a signal outputted from the front-end module and a signal inputted to the front-end module.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a diagram of the front-end module when viewed from a side of one main surface of a substrate; FIG. 2B is a sectional view of the front-end module taken along a line IIb-IIb shown in FIG. 2A.

FIGS. 13A and 13B are diagrams showing a portion of a substrate and a first inductor of a front-end module according to other preferred embodiments of the present invention.

DETAILED DESCRIPTION OF THE PREFERRED EMBODIMENTS

Figure 1:
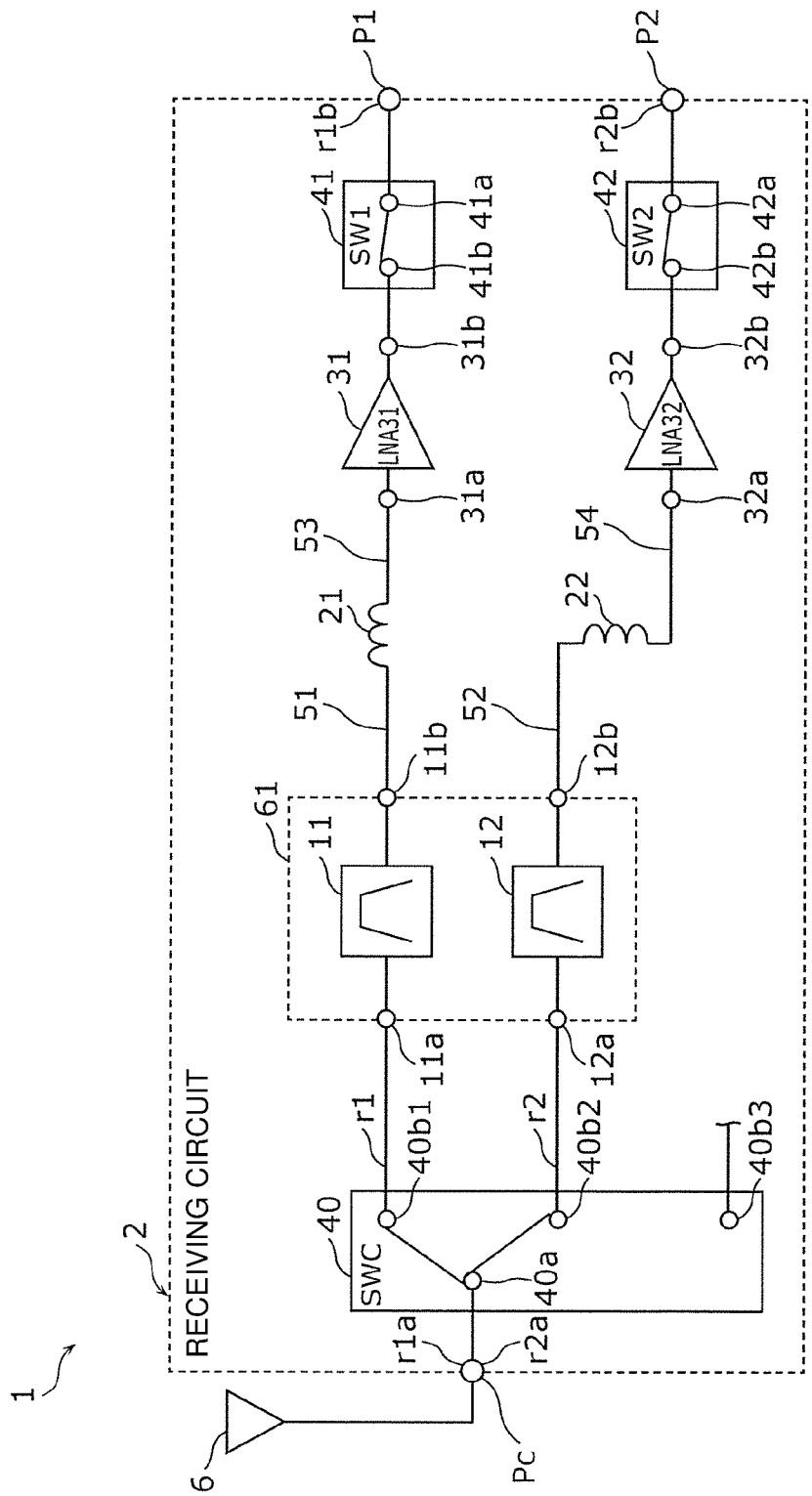
FIG. 1 is a diagram showing a circuit configuration of a front-end module according to a first preferred embodiment of the present invention.
Figure 2:
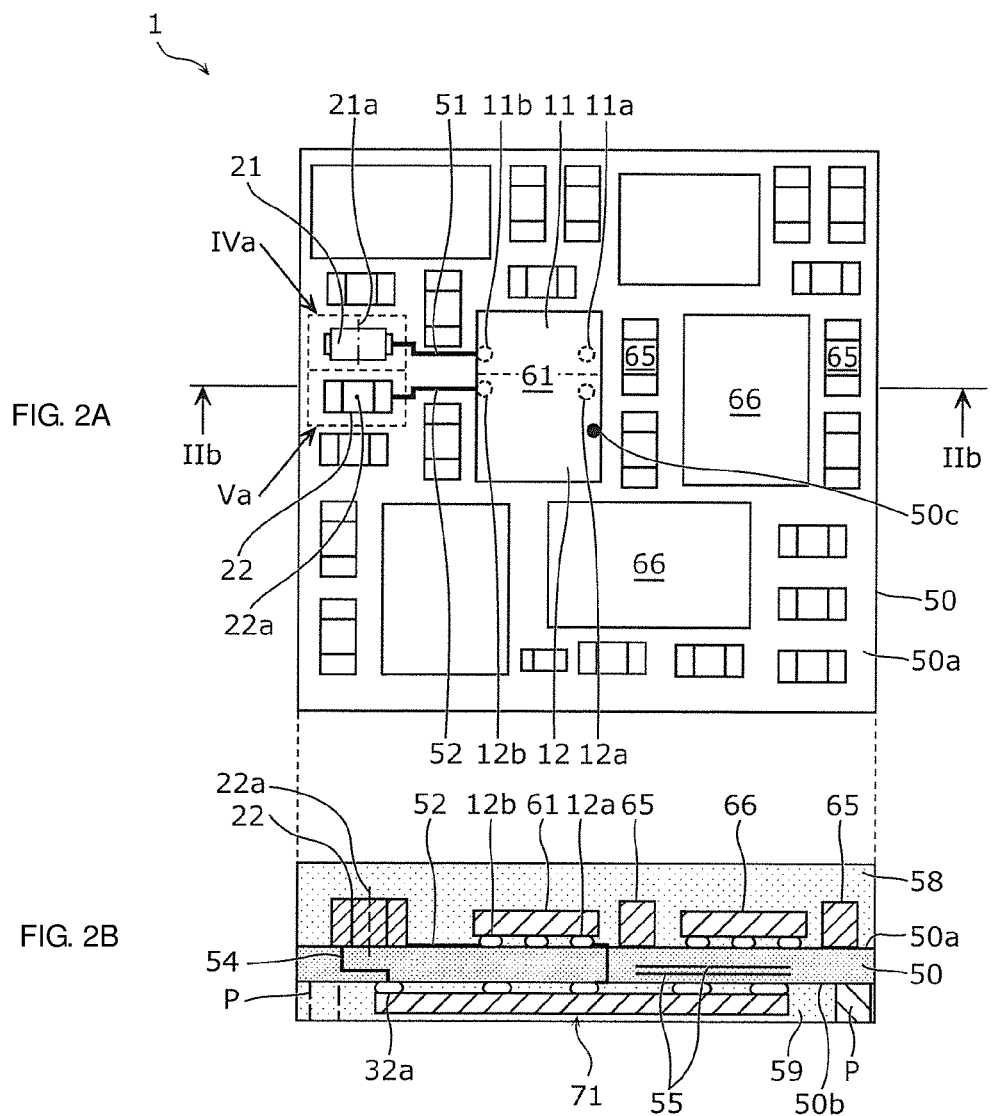
FIGS. 2A and 2B are diagrams showing the front-end module according to the first preferred embodiment of the present invention.

Hereinafter, front-end modules according to preferred embodiments of the present invention will be described with reference to the accompanying drawings. Each of the preferred embodiments described below represents an example of a preferred embodiment of the present invention. Numerical values, shapes, materials, elements, arrangement positions and connection configurations of elements, manufacturing processes, the order of the manufacturing processes, other elements and features shown in the following preferred embodiments are merely examples, and are not intended to limit the scope of the present invention. In addition, elements that are not described in independent claims among elements in the following preferred embodiments will be described as arbitrary or optional elements. Also, sizes or ratios of sizes of elements shown in the drawings are not necessarily strict. In addition, in each of the drawings, the same reference symbols denote the same or substantially the same configurations, and redundant descriptions thereof will be omitted or simplified.

First Preferred Embodiment

First, a circuit configuration of a front-end module 1 according to a first preferred embodiment of the present invention will be described with reference to FIG. 1.

FIG. 1 is a diagram showing a circuit configuration of the front-end module 1 according to the first preferred embodiment.

The front-end module 1 includes a receiving circuit 2 in which CA is executed. In the receiving circuit 2, when high-frequency signals in a plurality of bands belonging to the same frequency band group are simultaneously inputted, the CA of the plurality of bands is executed.

As shown in FIG. 1, an antenna element 6 is connected to a common input terminal Pc of the front-end module 1. A signal processing circuit (not shown) is connected to a first output terminal P1 and a second output terminal P2.

The front-end module 1 includes a first path r1 and a second path r2 to which a high-frequency signal is inputted when the CA is executed. The common input terminal Pc is provided at one end r1a of the first path r1, and the first output terminal P1 is provided at another end r1b of the first path r1. The common input terminal Pc is provided at one end r2a of the second path r2 that is in common with the one end r1a of the first path r1, and the second output terminal P2 is provided at another end r2b of the second path r2. The first path r1 and the second path r2 are defined by a common path between the common input terminal Pc and a common terminal 40a described later.

On the first path r1, an input side switch 40, a first filter 11, a first inductor 21, a first LNA 31 and a first output side switch 41 are disposed in order from the common input terminal Pc toward the first output terminal P1.

The first filter 11 is a filter circuit to filter and output a high-frequency signal inputted to the first path r1. The first filter 11 includes a filter input terminal 11a to which a high-frequency signal is inputted, and a filter output terminal 11b that outputs a signal filtered by the first filter 11. The filter input terminal 11a is connected to a selection terminal 40b1 of the input side switch 40, and the filter output terminal 11b is connected to one end of the first inductor 21.

The first LNA 31 is an amplifying circuit to amplify and output a signal filtered by the first filter 11. The first LNA 31 includes an LNA input terminal 31a to which a signal outputted from the first filter 11 is inputted, and an LNA output terminal 31b to output a signal amplified by the first LNA 31. The LNA input terminal 31a is connected to another end of the first inductor 21, and the LNA output terminal 31b is connected to a selection terminal 41b of the first output side switch 41.

The first inductor 21 is a matching element to perform impedance matching for the first filter 11 and the first LNA 31, and is provided between the first filter 11 and the first LNA 31. In the present preferred embodiment, since input impedance of the first LNA 31 has an imaginary part and is generally capacitive, an inductor connected in series is used as the matching element of the first LNA 31. For example, in the present preferred embodiment, an inductor having a high Q value is used as the first inductor 21 disposed on an input side of the first LNA 31, because a series resistance component increases and an insertion loss increases when a Q value of the inductor connected in series is low.

On the second path r2, the input side switch 40, a second filter 12, a second inductor 22, a second LNA 32, and a second output side switch 42 are disposed in order from the common input terminal Pc toward the second output terminal P2.

The second filter 12 is a filter circuit to filter and output a high-frequency signal inputted to the second path r2. The second filter 12 includes a filter input terminal 12a to which a high-frequency signal is inputted, and a filter output terminal 12b to output a signal filtered by the second filter 12. The filter input terminal 12a is connected to a selection terminal 40b2 of the input side switch 40, and the filter output terminal 12b is connected to one end of the second inductor 22.

The second LNA 32 is an amplifying circuit to amplify and output a signal filtered by the second filter 12. The second LNA 32 includes an LNA input terminal 32a to which a signal outputted from the second filter 12 is inputted, and an LNA output terminal 32b to output a signal amplified by the second LNA 32. The LNA input terminal 32a is connected to another end of the second inductor 22, and the LNA output terminal 32b is connected to a selection terminal 42b of the second output side switch 42.

The second inductor 22 is a matching element to perform impedance matching for the second filter 12 and the second LNA 32, and is provided between the second filter 12 and the second LNA 32. In the present preferred embodiment, since input impedance of the second LNA 32 has an imaginary part and is generally capacitive, an inductor connected in series is used as the matching element of the second LNA 32. For example, in the present preferred embodiment, an inductor having a high Q value is used as the second inductor 22 disposed on an input side of the second LNA 32, because a series resistance component increases and an insertion loss increases when a Q value of the inductor connected in series is low.

In addition, a coil axis of the second inductor 22 is orthogonal or substantially orthogonal to a coil axis of the first inductor 21. This will be described in detail below.

The input side switch 40 is disposed on the first path r1 between the common input terminal Pc and the first filter 11, and on the second path r2 between the common input terminal Pc and the second filter 12. The input side switch 40 is preferably, for example, a single pole n throw (SPnT)

switch, and includes the common terminal 40a and the plurality of selection terminals 40b1 and 40b2, and a selection terminal 40b3. The input side switch 40 is capable of simultaneously connecting the common terminal 40a and the selection terminal 40b1, and connecting the common terminal 40a and the selection terminal 40b2.

The first output side switch 41 is disposed on the first path r1 between the first LNA 31 and the first output terminal P1. The first output side switch 41 is preferably, for example, an SPnT switch, and includes a common terminal 41a and the selection terminal 41b. The first output side switch 41 is capable of selectively connecting or disconnecting the common terminal 41a and the selection terminal 41b.

The second output side switch 42 is disposed on the second path r2 between the second LNA 32 and the second output terminal P2. The second output side switch 42 is preferably, for example, an SPnT switch, and includes a common terminal 42a and the selection terminal 42b. The second output side switch 42 is capable of selectively connecting or disconnecting the common terminal 42a and the selection terminal 42b.

In the front-end module 1, the CA is executed by simultaneously connecting the common terminal 40a of the input side switch 40 and each of the selection terminals 40b1 and 40b2, and simultaneously connecting the common terminal 41a and the selection terminal 41b of the first output side switch 41, and connecting the common terminal 42a and the selection terminal 42b of the second output side switch 42. In addition, in the front-end module 1, by not connecting the common terminal 40a of the input side switch 40 to the selection terminals 40b1 and 40b2, but only connecting to the selection terminal 40b3, a state in which the CA is not executed may be set.

The CA in the front-end module 1 is executed in each Band corresponding to each of frequency band groups described below. Note that each Band shown below is Band that is standardized by Third Generation Partnership Project (3GPP).

For example, in a frequency band group (middle band) of about 1.8 GHz or more and about 2.2 GHz or less, the CA is executed by a combination of Band 3 and Band 1, or a combination of Band 3 and Band 66. In addition, in a frequency band group (high band) of about 2.3 GHz or more and about 2.7 GHz or less, the CA is executed by a combination of Band 40 and Band 7.

For example, in the frequency band group (middle band) of about 1.8 GHz or more and about 2.2 GHz or less, the CA is executed by a combination of Band 25 and Band 66, a combination of Band 2 and Band 4, or a combination of Band 2 and Band 66. In addition, in the frequency band group (high band) of about 2.3 GHz or more and about 2.7 GHz or less, the CA is executed by a combination of Band 30 and Band 41.

For example, in a frequency band group (ultra-high band) of about 3.3 GHz or more and about 5 GHz or less, the CA is executed by a combination of Band 77 and Band 79, a combination of Band 42 and Band 79, or a combination of Band 78 and Band 79.

Next, a structure of the front-end module 1 will be described with reference to FIGS. 2A to 5B.

Figure 3:
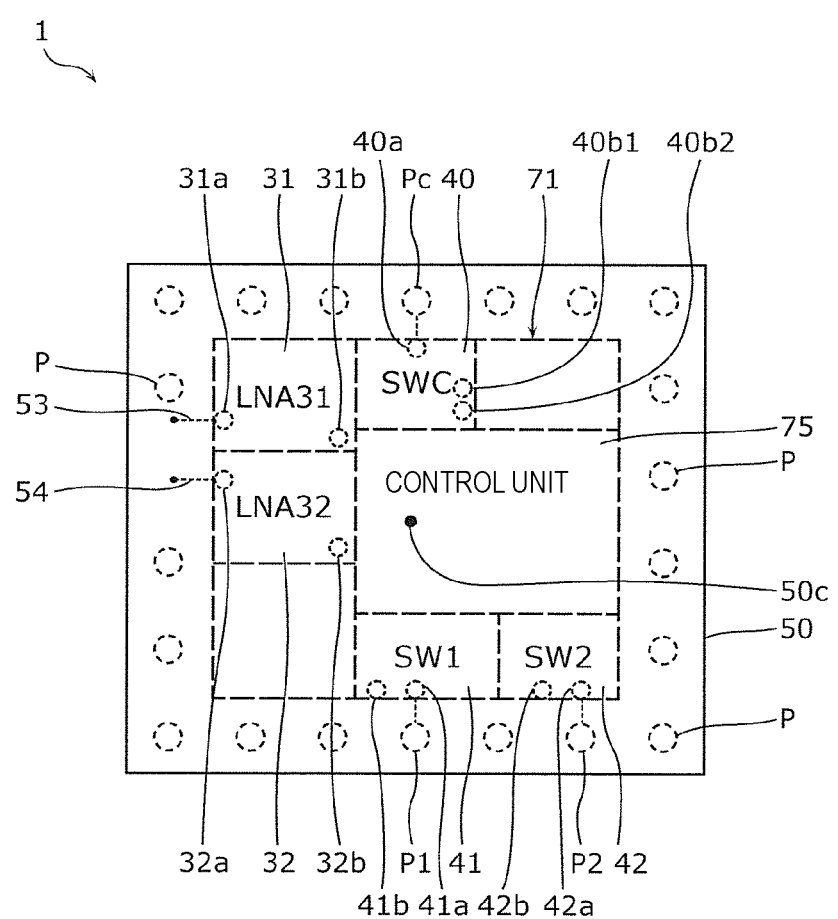
FIG. 3 is a perspective view of an integrated circuit component and an external terminal of the front-end module according to the first preferred embodiment of the present invention when viewed from the side of the one main surface of the substrate.
Figure 4:
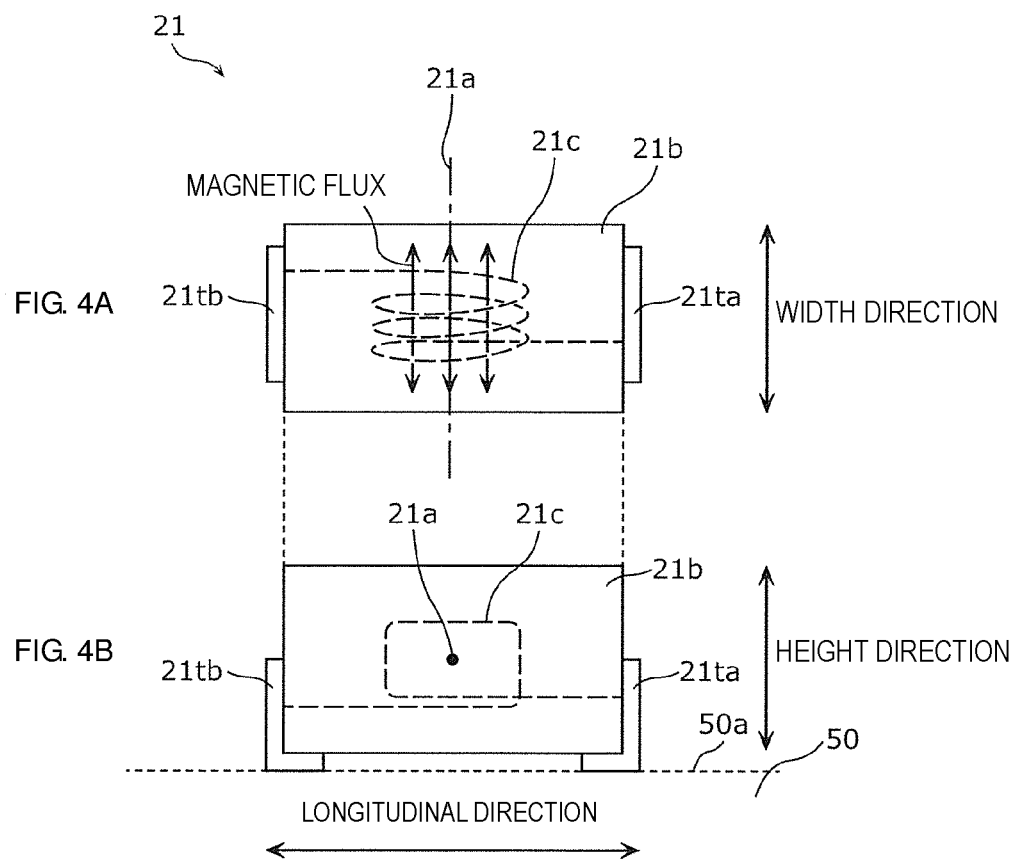
FIGS. 4A and 4B are diagrams showing a first inductor of the front-end module according to the first preferred embodiment of the present invention.
Figure 5:
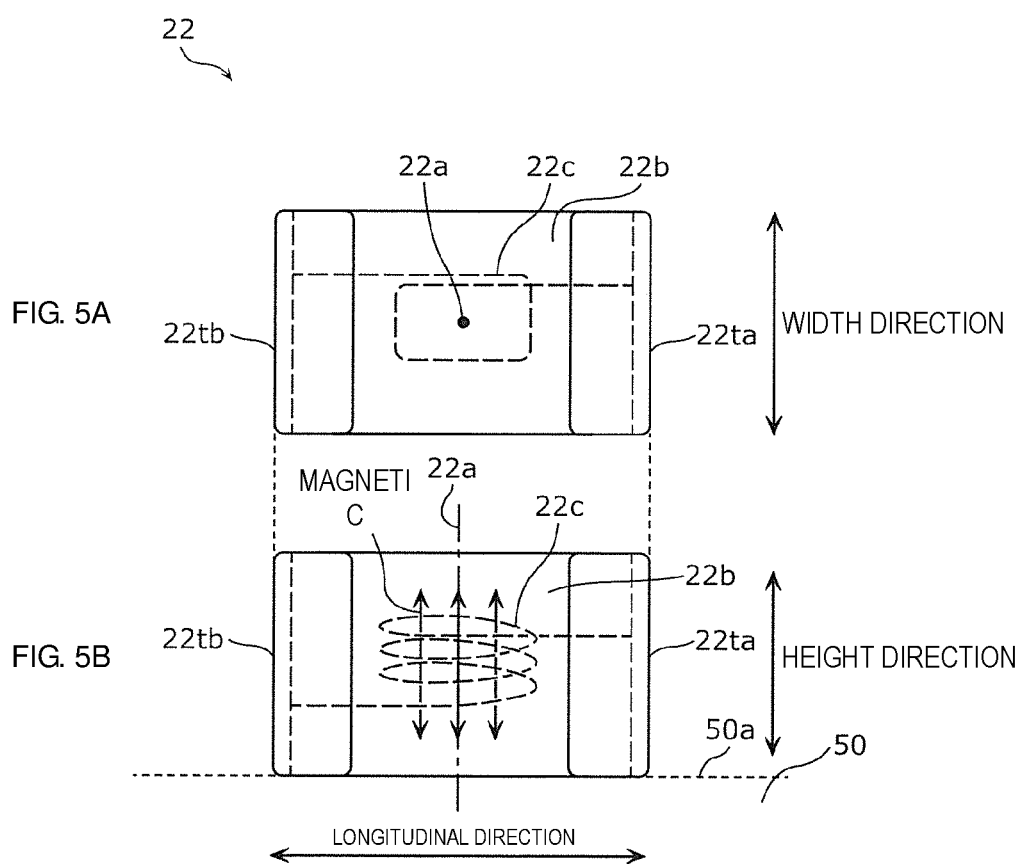
FIGS. 5A and 5B are diagrams showing a second inductor of the front-end module according to the first preferred embodiment of the present invention.

FIGS. 2A and 2B are diagrams showing the front-end module 1. FIG. 2A is a diagram of the front-end module 1 when viewed from a side of one main surface 50a of a substrate 50, and FIG. 2B is a sectional view of the front-end module 1 taken along a line IIb-IIb shown in FIG. 2A. FIG. 3 is a perspective view of an integrated circuit component 71 and an external terminal P of the front-end module 1 when viewed from the side of the one main surface 50a of the substrate 50. In FIG. 2A, resin sealing portions 58 and 59 are not shown.

The front-end module 1 includes the substrate 50, and the receiving circuit 2 provided in or on the substrate 50. The receiving circuit 2 includes the first filter 11, the second filter 12, the first inductor 21, and the second inductor 22 mounted on the one main surface 50a of the substrate 50, and the integrated circuit component 71 mounted on another main surface 50b of the substrate 50.

The substrate 50 preferably has, for example, a rectangular or substantially rectangular shape when viewed from the side of the one main surface 50a. The other main surface 50b of the substrate 50 is, when the front-end module 1 is mounted on a mother substrate (not shown) in an electronic device, a surface facing the mother substrate.

The substrate 50 includes a base material portion provided by laminating a plurality of insulating base materials, routing wiring provided in an inside and on a surface of the base material portion, and a plurality of ground electrodes 55 provided in the inside of the base material portion. Each of the routing wiring and the ground electrode 55 is preferably made of, for example, a metal material containing copper as a main component. The routing wiring is defined an in-plane conductor, a surface conductor, an interlayer conductor, and other suitable conductors. The ground electrode 55 is defined by an in-plane conductor, and is connected to ground with the external terminal P described below interposed therebetween.

As shown in FIG. 2B and FIG. 3, the integrated circuit component 71 is mounted on the other main surface 50b of the substrate 50. Further, a plurality of the external terminals P are provided on the other main surface 50b of the substrate 50.

The integrated circuit component 71 is a single mounted component including the first LNA 31, the second LNA 32, the input side switch 40, the first output side switch 41, and the second output side switch 42 described above. The integrated circuit component 71 preferably has, for example, a rectangular or substantially rectangular parallelepiped shape, and includes a plurality of input/output terminals on a bottom surface. Specifically, the LNA input terminal 31a and the LNA output terminal 31b are provided on a bottom surface of a portion of the integrated circuit component 71 on which the first LNA 31 is provided, and the LNA input terminal 32a and the LNA output terminal 32b are provided on a bottom surface of a portion on which the second LNA 32 is provided.

In addition, the integrated circuit component 71 includes a controller 75. The controller 75 controls on/off of the input side switch 40, the first output side switch 41, and the second output side switch 42, and controls gains of the first LNA 31 and the second LNA 32. The controller 75 is connected to a controlling external terminal among the plurality of external terminals P.

The plurality of external terminals P surround an outer side portion of the integrated circuit component 71, and project perpendicularly or substantially perpendicularly from the other main surface 50b. Each of the plurality of external terminals P is connected to a mother substrate when the front-end module 1 is mounted on the mother substrate. Each of the plurality of external terminals P is a hot terminal or a ground terminal, and includes the common input terminal Pc, the first output terminal P1, and the second output terminal P2 described above, as hot terminals.

The common input terminal Pc is connected to the common terminal 40a of the input side switch 40. The selection terminal 40b1 of the input side switch 40 is connected to the first filter 11 on the side of the one main surface 50a of the substrate 50 with routing wiring interposed therebetween, and the selection terminal 40b2 is connected to the second filter 12 on the side of the one main surface 50a of the substrate 50 with routing wiring interposed therebetween.

The LNA output terminal 31b of the first LNA 31 is connected to the selection terminal 41b of the first output side switch 41 with internal wiring of the integrated circuit component 71 interposed therebetween. The common terminal 41a of the first output side switch 41 is connected to the first output terminal P1 with routing wiring interposed therebetween. Note that the LNA input terminal 31a is connected to the first inductor 21 on the side of the one main surface 50a of the substrate 50 with routing wiring interposed therebetween.

The LNA output terminal 32b of the second LNA 32 is connected to the selection terminal 42b of the second output side switch 42 with internal wiring of the integrated circuit component 71 interposed therebetween. The common terminal 42a of the second output side switch 42 is connected to the second output terminal P2 with routing wiring interposed therebetween. Note that the LNA input terminal 32a is connected to the second inductor 22 on the side of the one main surface 50a of the substrate 50 with routing wiring interposed therebetween.

On the other main surface 50b of the substrate 50, the resin sealing portion 59 covers the integrated circuit component 71 and a side surface of the external terminal P. As a material of the resin sealing portion 59, for example, a thermosetting resin material such as an epoxy resin is preferably used. Note that, the resin sealing portion 59 need not necessarily be provided on the other main surface 50b. The integrated circuit component 71 may be fixed to the substrate 50 by an underfill or other suitable structure.

As shown in FIGS. 2A and 2B, a filter component 61, the first inductor 21, the second inductor 22, and a plurality of mounted components 65 and 66 are mounted on the one main surface 50a of the substrate 50. When viewed from the side of the one main surface 50a of the substrate 50, the filter component 61 is disposed closer to a center 50c than to a circumference of the substrate 50, and the first inductor 21 and the second inductor 22 are disposed closer to the circumference than to the center 50c of the substrate 50. Note that, the mounted component 65 is preferably, for example, an inductor, a capacitor, or a resistor element, and the mounted component 66 is preferably, for example, an LC filter or an elastic wave filter.

The filter component 61 is a single mounted component including the first filter 11 and the second filter 12 described above. Each of the first filter 11 and the second filter 12 is preferably, for example, a surface acoustic wave (SAW) filter. Note that, each of the first filter 11 and the second filter 12 is not limited to the SAW filter, and may be a bulk acoustic wave (BAW) filter, for example.

The filter component 61 preferably has, for example, a rectangular or substantially rectangular parallelepiped shape, and a plurality of input/output terminals are provided on a bottom surface. Specifically, the filter input terminal 11a and the filter output terminal 11b are provided on a bottom surface of a portion of the filter component 61 on which the first filter 11 is provided, and the filter input terminal 12a and the filter output terminal 12b are provided on a bottom surface of a portion on which the second filter 12 is provided.

The filter input terminal 11a is connected to the selection terminal 40b1 of the input side switch 40 described above, and the filter output terminal 11b is connected to the one end of the first inductor 21 with wiring 51 interposed therebetween. The filter input terminal 12a is connected to the selection terminal 40b2 of the input side switch 40 described above, and the filter output terminal 12b is connected to the one end of the second inductor 22 with wiring 52 interposed therebetween.

The first inductor 21 and the second inductor 22 are mounted closer to the circumference of the substrate 50 than the filter component 61 is. The one end of the first inductor 21 is connected to the filter output terminal 11b, and the other end is connected to the LNA input terminal 31a with wiring 53 (see FIG. 3) interposed therebetween. The one end of the second inductor 22 is connected to the above-described filter output terminal 12b, and another end is connected to the LNA input terminal 32a with wiring 54 interposed therebetween. The wiring 53 connecting the first inductor 21 and the first LNA 31 is shorter than the wiring 51 connecting the first filter 11 and the first inductor 21. The wiring 54 connecting the second inductor 22 and the second LNA 32 is shorter than the wiring 52 connecting the second filter 12 and the second inductor 22.

Each of the first inductor 21 and the second inductor 22 preferably has, for example, a rectangular or substantially rectangular parallelepiped shape, and the inductors are disposed on the one main surface 50a of the substrate 50 so as to be adjacent to each other. Specifically, the first inductor 21 and the second inductor 22 are disposed such that the inductors are adjacent to each other in a width direction, and an axis along a longitudinal direction of the first inductor 21 and an axis along a longitudinal direction of the second inductor 22 are parallel or substantially parallel to each other.

Further, in the present preferred embodiment, the first inductor 21 is mounted on the one main surface 50a of the substrate 50, such that a coil axis 21a of the first inductor 21 is parallel or substantially parallel to the one main surface 50a of the substrate 50. Further, the second inductor 22 is mounted on the one main surface 50a of the substrate 50, such that a coil axis 22a of the second inductor 22 is perpendicular or substantially perpendicular to the one main surface 50a of the substrate 50. The coil axis 21a and the coil axis 22a are different in respective axial directions thereof. In other words, the coil axis 21a of the first inductor 21 and the coil axis 22a of the second inductor 22 extend in different directions from each other.

Here, with reference to FIGS. 4A and 4B, and FIGS. 5A and 5B, a detailed description of the mounting structure of the first inductor 21 and the second inductor 22 will be provided.

FIGS. 4A and 4B are diagrams showing the first inductor 21 of the front-end module 1. FIG. 4A is an enlarged diagram of an IVa portion of FIG. 2A, and FIG. 4B is a front view of FIG. 4A.

The first inductor 21 is a chip inductor preferably manufactured by a method including, for example, a sheet lamination method, a printing lamination method, or a thin film formation method. The first inductor 21 preferably has, for example, a rectangular or substantially rectangular parallelepiped element body 21b, a substantially coil-shaped inner conductor 21c provided in the element body 21b, a bottom electrode 21ta provided on one end side of the element body 21b, and a bottom electrode 21tb provided on another end side of the element body 21b. The bottom electrodes 21ta and 21tb are provided on portions of a bottom surface of the element body 21b and respective portions of both end surfaces in a longitudinal direction. The first inductor 21 has the coil axis 21a along a width direction.

The first inductor 21 is solder-mounted on the one main surface 50a of the substrate 50 with the bottom electrodes 21ta and 21tb interposed therebetween. When the first inductor 21 is mounted on the substrate 50, the coil axis 21a of the first inductor 21 is parallel or substantially parallel to the one main surface 50a of the substrate 50. In other words, a direction of magnetic flux of the first inductor 21 when the CA is executed is parallel or substantially parallel to the one main surface 50a of the substrate 50. Note that "the coil axis 21a is parallel or substantially parallel to the one main surface 50a of the substrate 50" means that an angular shift of the coil axis 21a with respect to the one main surface 50a of the substrate 50 is within about +/−15%.

FIGS. 5A and 5B are diagrams showing the second inductor 22 of the front-end module 1. FIG. 5A is an enlarged diagram of a Va portion of FIG. 2A, and FIG. 5B is a front view of FIG. 5A.

The second inductor 22 is a chip inductor preferably manufactured by a method including, for example, a sheet lamination method, a printing lamination method, or a thin film formation method. The second inductor 22 preferably has, for example, a rectangular or substantially rectangular parallelepiped element body 22b, a substantially coil-shaped inner conductor 22c provided in the element body 22b, an outer electrode 22ta provided on one end side of the element body 22b, and an outer electrode 22tb provided on another end side of the element body 21b. The outer electrodes 22ta and 22tb are provided on both entire end surfaces of the element body 22b in a longitudinal direction and portions of four side surfaces of the element body 22b, respectively. The second inductor 22 has the coil axis 22a along a height direction.

The second inductor 22 is solder-mounted on the one main surface 50a of the substrate 50 with the outer electrodes 22ta and 22tb interposed therebetween. When the second inductor 22 is mounted on the substrate 50, the coil axis 22a of the second inductor 22 is perpendicular or substantially perpendicular to the one main surface 50a of the substrate 50. In other words, a direction of magnetic flux of the second inductor 22 when the CA is executed is perpendicular or substantially perpendicular to the one main surface 50a of the substrate 50. Note that "the coil axis 22a is perpendicular or substantially perpendicular to the one main surface 50a of the substrate 50" means that an angular shift of the coil axis 22a with respect to a perpendicular axis of the one main surface 50a of the substrate 50 is within about +/−15%.

For each of the first inductor 21 and the second inductor 22, an inductor having a high quality factor Q is provided, and for example, the Q value is about 20 or more at a frequency of about 2 GHz, and more preferably, the Q value is about 50 or more at a frequency of about 2 GHz. For example, a Q value of the first inductor 21 is preferably equal to or more than about 0.9 times, and equal to or less than about 1.1 times a Q value of the second inductor 22.

The resin sealing portion 58 is provided on the one main surface 50a of the substrate 50 so as to cover the filter component 61, the first inductor 21, the second inductor 22, and the plurality of mounted components 65 and 66. As a material of the resin sealing portion 58, for example, a thermosetting resin material such as an epoxy resin is preferably used. Note that a shield film may be provided on a side surface of the substrate 50, a side surface and a top surface of the resin sealing portion 58, and a side surface of the resin sealing portion 59.

In this manner, in the front-end module 1, the first inductor 21 and the second inductor 22 for matching a filter and an LNA are disposed next to each other on the substrate 50, the first inductor 21 is mounted such that the coil axis 21a is parallel or substantially parallel to the substrate 50, and the second inductor 22 is mounted such that the coil axis 22a is perpendicular or substantially perpendicular to the substrate 50.

With this structure, when the CA is executed in the front-end module 1, it is possible to prevent electromagnetic field coupling between the first inductor 21 and the second inductor 22. Thus, it is possible to prevent the occurrence of leaking of an unnecessary signal and intermodulation distortion caused by the above-described electromagnetic field coupling, and it is possible to prevent deterioration in characteristics, such as a noise figure, in the front-end module 1.

In addition, in the front-end module 1, when viewed from the side of the one main surface 50a of the substrate 50, an input terminal of a filter is disposed close to the center 50c of the substrate 50, a matching inductor is disposed close to the circumference of the substrate 50, and an input terminal of an LNA is disposed close to the circumference of the substrate 50. When this is viewed in a signal path, the front-end module 1 has a structure in which a signal flows in a direction from the center 50c of the substrate 50 toward the circumference on the side of the one main surface 50a of the substrate 50, and a signal flows in a direction from the circumference of the substrate 50 toward the center 50c on a side of the other main surface 50b.

Specifically, when the front-end module 1 is viewed from the side of the one main surface 50a of the substrate 50, each of the first inductor 21 and the second inductor 22 is disposed closer to the circumference than to the center 50c of the substrate 50. The first filter 11 is disposed such that the filter input terminal 11a is located closer to the center 50c of the substrate 50 than the filter output terminal 11b is, and the filter output terminal 11b is located closer to the first inductor 21 than the filter input terminal 11a is. Further, the second filter 12 is disposed such that the filter input terminal 12a is located closer to the center 50c of the substrate 50 than the filter output terminal 12b is, and the filter output terminal 12b is located closer to the second inductor 22 than the filter input terminal 12a is.

Further, the first LNA 31 is disposed such that the LNA input terminal 31a is located closer to the circumference of the substrate 50 (i.e., closer to the first inductor 21) than the LNA output terminal 31b is, and the LNA output terminal 31b is located closer to the center 50c of the substrate 50 than the LNA input terminal 31a is. Further, the second LNA 32 is disposed such that the LNA input terminal 32a is located closer to the circumference of the substrate 50 (i.e., closer to the second inductor 22) than the LNA output terminal 32b is, and the LNA output terminal 32b is located closer to the center 50c of the substrate 50 than the LNA input terminal 32a is.

According to this structure, respective components mounted on the substrate 50 may be disposed close to each other, and wiring paths between the components may be shortened. In the present preferred embodiment, while achieving high integration of the front-end module 1, it is possible to prevent electromagnetic field coupling between the first inductor 21 and the second inductor 22 when the CA is executed.

The front-end module 1 according to the present preferred embodiment includes the substrate 50, and the receiving circuit 2 that is provided in or on the substrate 50 and on which the CA is executed. The receiving circuit 2 includes the substrate 50, the first path r1 and the second path r2 to which a high-frequency signal is inputted when the CA is executed, the first filter 11 disposed on the first path r1 and filtering a high-frequency signal, the first LNA 31 disposed on the first path r1 and amplifying a signal filtered by the first filter 11, the first inductor 21 disposed on the first path r1 between the first filter 11 and the first LNA 31 and performing impedance matching for the first filter 11 and the first LNA 31, the second filter 12 disposed on the second path r2 and filtering a high-frequency signal, the second LNA 32 disposed on the second path r2 and amplifying a signal filtered by the second filter 12, and the second inductor 22 disposed on the second path r2 between the second filter 12 and the second LNA 32 and performing impedance matching for the second filter 12 and the second LNA 32. The coil axis 21a of the first inductor 21 and the coil axis 22a of the second inductor 22 are different from each other.

As described above, since the coil axis 21a of the first inductor 21 and the coil axis 22a of the second inductor 22 are different from each other, when the CA is executed in the front-end module 1, it is possible to prevent electromagnetic field coupling between the first inductor 21 and the second inductor 22. Thus, it is possible to prevent characteristic deterioration in the front-end module 1.

Further, the first inductor 21 is mounted on the one main surface 50a of the substrate 50 such that the coil axis 21a of the first inductor 21 is parallel or substantially parallel to the one main surface 50a of the substrate 50. The second inductor 22 is mounted on the one main surface 50a of the substrate 50 such that the coil axis 22a of the second inductor 22 is perpendicular or substantially perpendicular to the one main surface 50a of the substrate 50.

In this manner, since the first inductor 21 and the second inductor 22 are mounted such that the coil axis 21a is parallel or substantially parallel to the one main surface 50a, and the coil axis 22a is perpendicular or substantially perpendicular to the one main surface 50a, when the CA is executed in the front-end module 1, it is possible to prevent electromagnetic field coupling between the first inductor 21 and the second inductor 22. Thus, it is possible to prevent characteristic deterioration in the front-end module 1.

Further, the first inductor 21 and the second inductor 22 are disposed on the one main surface 50a of the substrate 50 adjacent to each other.

As described above, since the first inductor 21 and the second inductor 22 are disposed adjacent to each other, when the CA is executed in the front-end module 1, it is possible to prevent electromagnetic field coupling between the first inductor 21 and the second inductor 22. Thus, it is possible to prevent characteristic deterioration in the front-end module 1.

Further, the front-end module 1 may further include the plurality of external terminals P provided on the other main surface 50b of the substrate 50, and the first filter 11 and the second filter 12 may be mounted on the one main surface 50a of the substrate 50, and the first LNA 31 and the second LNA 32 may be mounted on the other main surface 50b of the substrate 50.

As described above, by mounting the first LNA 31 and the second LNA 32, and the first filter 11 and the second filter 12 on the different main surfaces of the substrate 50, the front-end module 1 may be miniaturized and/or highly integrated.

Further, for example, when the second inductor 22 is provided on the other main surface 50b along with the external terminal P, and when the front-end module is mounted on a mother substrate of an electronic device, there is a risk that a magnetic field generated by the second inductor 22 is blocked by the mother substrate. On the other hand, in the present preferred embodiment, by providing the second inductor 22 on the one main surface 50a of the substrate 50, and providing the plurality of external terminals P on the other main surface 50b of the substrate 50, when the front-end module 1 is mounted on a mother substrate, it is possible to prevent a magnetic field generated by the second inductor 22 from being blocked by the mother substrate. Thus, deterioration in Q characteristics of the second inductor 22 is able to be prevented, and characteristic deterioration in the front-end module 1 is able to be prevented.

Also, the plurality of external terminals P may include the common input terminal Pc provided at the one end r1a of the first path r1 and at the one end r2a of the second path r2 that is in common with the one end r1a of the first path r1, the first output terminal P1 provided at the other end r1b of the first path r1, and the second output terminal P2 provided at the other end r2b of the second path r2, further, the receiving circuit 2 may include the input side switch 40 disposed on the first path r1 between the common input terminal Pc and the first filter 11, and, on the second path r2 between the common input terminal Pc and the second filter 12, the first output side switch 41 disposed on the first path r1 between the first LNA 31 and the first output terminal P1, and the second output side switch 42 disposed on the second path r2 between the second LNA 32 and the second output terminal P2.

With this structure, it is possible to reliably execute the CA in accordance with a case in which the CA is required, by using the input side switch 40, the first output side switch 41, and the second output side switch 42.

Also, the first filter 11 and the second filter 12 may be included in the single filter component 61, and the first LNA 31 and the second LNA 32 may be included in the single integrated circuit component 71.

With this structure, it is possible to miniaturize and/or highly integrate the front-end module 1.

Further, each of the first inductor 21 and the second inductor 22 may be a chip component.

With this structure, it is possible to increase the Q value of each of the first inductor 21 and the second inductor 22, and reduce an insertion loss of a signal inputted to each of the first LNA 31 and the second LNA 32.

Further, each of the first inductor 21 and the second inductor 22 may have a rectangular or substantially rectangular parallelepiped shape, and the first inductor 21 and the second inductor 22 may be mounted such that an axis along a longitudinal direction of the first inductor 21 and an axis along a longitudinal direction of the second inductor 22 are parallel or substantially parallel to each other.

With this structure, it is possible to reduce a required area when the first inductor 21 and the second inductor 22 are mounted, and thus it is possible to miniaturize and/or highly integrate the front-end module 1.

Further, on the first path r1, the wiring 53 connecting the first inductor 21 and the first LNA 31 may be shorter than the wiring 51 connecting the first filter 11 and the first inductor 21, and on the second path r2, the wiring 54 connecting the second inductor 22 and the second LNA 32 may be shorter than the wiring 52 connecting the second filter 12 and the second inductor 22.

As described above, by shortening the wiring 53 and the wiring 54 provided on an input side of the LNA, parasitic capacitance due to the wiring 53 and the wiring 54 is able to be reduced, and in the front-end module 1, deterioration in characteristics, such as a noise factor, is able to be prevented.

Further, in the receiving circuit 2, when high-frequency signals in a plurality of bands belonging to an identical frequency band group are simultaneously inputted, the CA for the plurality of bands is able to be executed.

With this structure, when high-frequency signals in a plurality of bands belonging to the identical frequency band group are simultaneously inputted to the front-end module 1, it is possible to prevent electromagnetic field coupling between the first inductor 21 and the second inductor 22. Thus, it is possible to prevent characteristic deterioration in the front-end module 1.

For example, at the time of CA, when frequency differences between a plurality of bands are small, characteristic deterioration in the front-end module tends to occur due to an increase in noise due to leaking of a signal, the occurrence of intermodulation distortion, or other factors. On the other hand, the front-end module 1 of the present preferred embodiment, even when frequency differences between a plurality of bands are small, is capable of preventing leaking of a signal, such as electromagnetic field coupling, and thus is useful to prevent characteristic deterioration due to an increase in noise or intermodulation distortion or other factors.

Note that the above-described frequency band group may be a frequency band of about 1.8 GHz or more and about 2.2 GHz or less. The above-described frequency band group may be a frequency band of about 2.3 GHz or more and about 2.7 GHz or less. The above-described frequency band group may be a frequency band of about 3.3 GHz or more and about 5 GHz or less.

Note that the above-described plurality of bands may be Band 3 and Band 1 in 3GPP, or Band 3 and Band 66 in 3GPP. The above-described plurality of bands may be Band 40 and Band 7 in 3GPP. The above-described plurality of bands may be Band 25 and Band 66 in 3GPP, Band 2 and Band 4 in the 3GPP, or Band 2 and Band 66 in the 3GPP. The above-described plurality of bands may be Band 30 and Band 41 in 3GPP. The above-described plurality of bands may be Band 77 and Band 79 in 3GPP, Band 42 and Band 79 in the 3GPP, or Band 78 and Band 79 in the 3GPP.

Next, the structure of a front-end module 1A according to a first modification of the first preferred embodiment will be described with reference to FIG. 6. In the first modification, an example will be described in which the first inductor 21 and the second inductor 22 are disposed adjacent to each other in a longitudinal direction.

Figure 6:
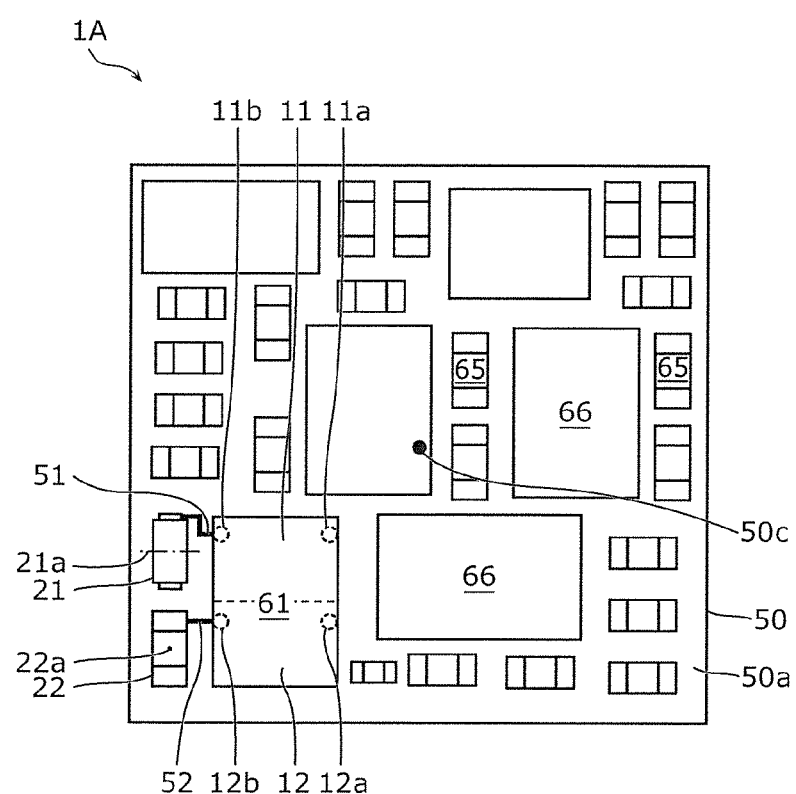
FIG. 6 is a diagram of a front-end module according to a first modification of the first preferred embodiment of the present invention when viewed from a side of one main surface of a substrate.

FIG. 6 is a diagram of the front-end module 1A according to the first modification when viewed from a side of the one main surface 50a of the substrate 50. Note that, in FIG. 6, the resin sealing portion 58 is not shown.

As shown in FIG. 6, the filter component 61, the first inductor 21, the second inductor 22, and the plurality of mounted components 65 and 66 are mounted on the one main surface 50a of the substrate 50.

Each of the first inductor 21 and the second inductor 22 preferably has, for example, a rectangular or substantially rectangular parallelepiped shape, and the inductors are disposed on the one main surface 50a of the substrate 50 so as to be adjacent to each other. Specifically, the first inductor 21 and the second inductor 22 are disposed adjacent to each other in the longitudinal direction, and an axis along the longitudinal direction of the first inductor 21 and an axis along the longitudinal direction of the second inductor 22 are coincident or substantially coincident.

Also in the front-end module 1A, the coil axis 21a of the first inductor 21 and the coil axis 22a of the second inductor 22 are different from each other. With this structure, when the CA is executed in the front-end module 1A, it is possible to prevent electromagnetic field coupling between the first inductor 21 and the second inductor 22.

Next, the structure of a front-end module 1B according to a second modification of the first preferred embodiment will be described with reference to FIG. 7. In the second modification, an example will be described in which the first inductor 21 and the second inductor 22 are disposed in an intersecting manner in a longitudinal direction.

Figure 7:
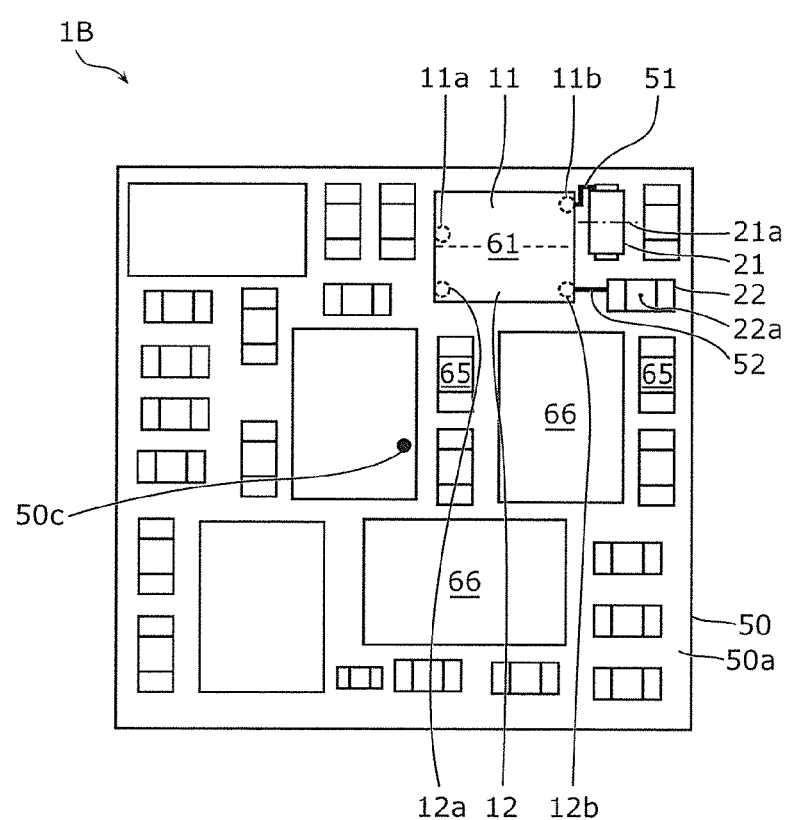
FIG. 7 is a diagram of a front-end module according to a second modification of the first preferred embodiment of the present invention when viewed from a side of one main surface of a substrate.

FIG. 7 is a diagram of the front-end module 1B according to the second modification when viewed from a side of the one main surface 50a of the substrate 50. Note that, in FIG. 7, the resin sealing portion 58 is not shown.

As shown in FIG. 7, the filter component 61, the first inductor 21, the second inductor 22, and the plurality of mounted components 65 and 66 are mounted on the one main surface 50a of the substrate 50.

Each of the first inductor 21 and the second inductor 22 preferably has, for example, a rectangular or substantially rectangular parallelepiped shape, and the inductors are disposed on the one main surface 50a of the substrate 50 adjacent to each other. Specifically, the first inductor 21 and the second inductor 22 are disposed adjacent to each other so as to be orthogonal or substantially orthogonal to each other in a longitudinal direction.

Also in the front-end module 1B, the coil axis 21a of the first inductor 21 and the coil axis 22a of the second inductor 22 are different from each other. With this structure, when the CA is executed in the front-end module 1B, it is possible to prevent electromagnetic field coupling between the first inductor 21 and the second inductor 22.

Next, the structure of a front-end module 1C according to a third modification of the first preferred embodiment will be described with reference to FIGS. 8A and 8B. In the third modification, an example in which a portion of a region of a ground electrode 55a is removed below the second inductor 22 will be described.

Figure 8:
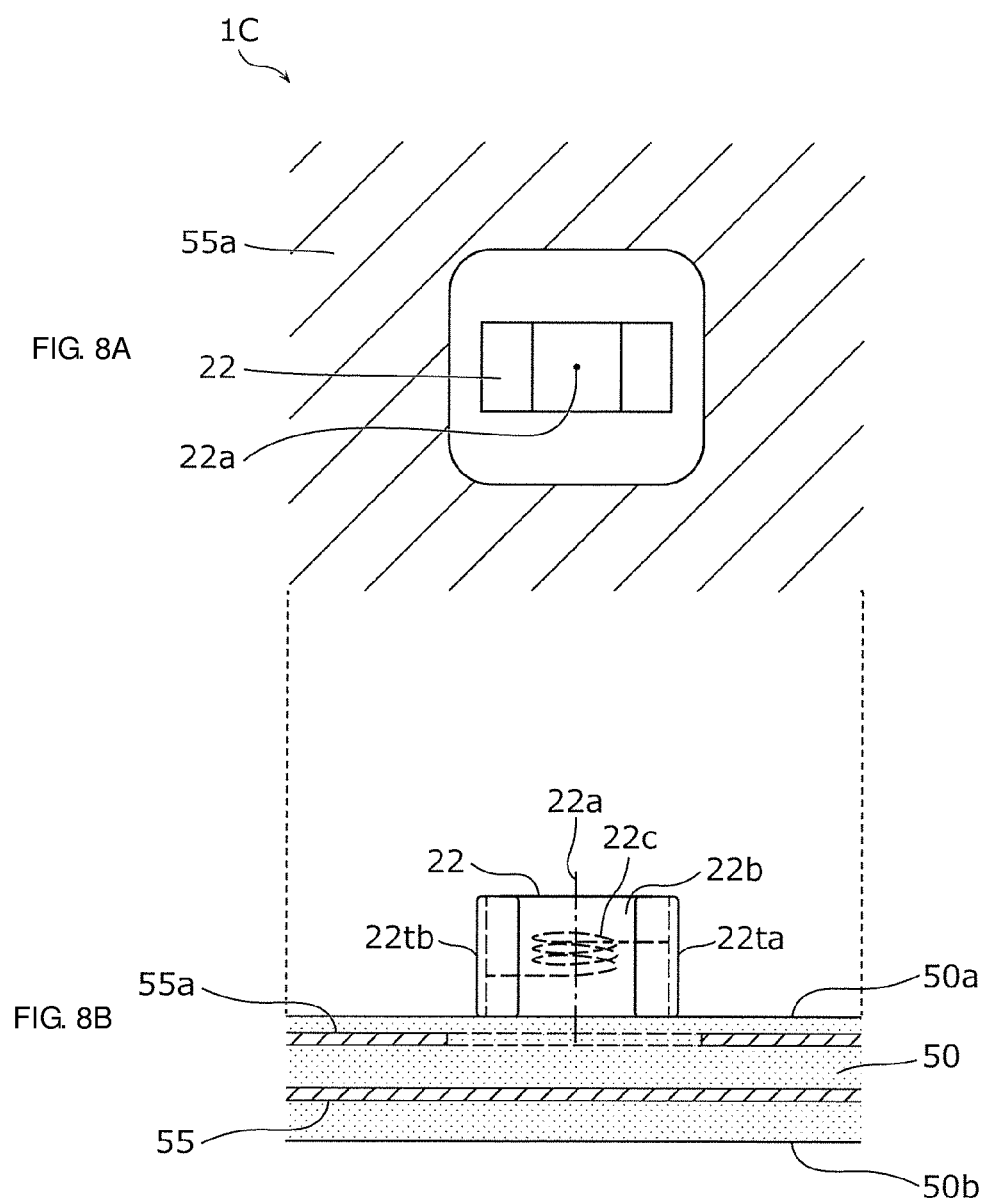
FIGS. 8A and 8B are diagrams showing a portion of a substrate and a second inductor of a front-end module according to a third modification of the first preferred embodiment of the present invention.

FIGS. 8A and 8B are diagrams showing a portion of the substrate 50 and the second inductor 22 of the front-end module 1C according to the third modification. FIG. 8A is a perspective view of the ground electrode 55a and the second inductor 22 when viewed from a side of one main surface 50a of the substrate 50, and FIG. 8B is a sectional view of FIG. 8A.

As shown in FIG. 8B, the plurality of ground electrodes 55 and 55a are provided inside the substrate 50. Note that, ground electrodes are not limited to be provided in a plurality of layers, and may be provided in a single layer.

As shown in FIGS. 8A and 8B, when the front-end module 1C is viewed from the side of the one main surface 50a of the substrate 50, the ground electrode 55a located closest to the one main surface 50a of the substrate 50 of the plurality of ground electrodes 55 and 55a includes an electrode pattern shape that does not overlap with the second inductor 22. Specifically, a portion of a region of the ground electrode 55a is removed in a direction along the coil axis 22a of the second inductor 22.

As described above, in the front-end module 1C according to the third modification, one or more ground electrodes 55 and 55a are provided, inside the substrate 50, in parallel or substantially in parallel to the one main surface 50a of the substrate 50. When the front-end module 1C is viewed from the side of the one main surface 50a of the substrate 50, the ground electrode 55a located closest to the one main surface 50a of the substrate 50 among the one or more ground electrodes 55 and 55a includes an electrode pattern shape that does not overlap with the second inductor 22.

As described above, when viewed from the side of the one main surface 50a of the substrate 50, the ground electrode 55a includes the electrode pattern shape that does not overlap with the second inductor 22, thus it is possible to prevent a magnetic field generated by the second inductor 22 from being blocked by the ground electrode 55a. Thus, deterioration in Q characteristics of the second inductor 22 is able to be prevented, and characteristic deterioration in the front-end module 1C is able to be prevented.

In the present modification, an area removed from the ground electrode 55a is preferably larger than an area of the second inductor 22, but the present invention is not limited thereto. For example, an area removed from the ground electrode 55a may be an area smaller than an area of the second inductor 22. Further, in the present modification, the ground electrode from which a portion of the region is removed is the ground electrode 55a located closest to the one main surface 50a of the substrate 50, but the present invention is not limited thereto. For example, a ground electrode from which a portion of a region is removed may be the ground electrode 55a, and the ground electrode 55 located in a layer different from that of the ground electrode 55a. A ground electrode from which a portion of a region is removed may be provided in a plurality of layers including the ground electrode 55 in a next layer of the ground electrode 55a.

Next, the structure of a front-end module 1D according to a fourth modification of the first preferred embodiment will be described with reference to FIG. 9 and FIG. 10. In the fourth modification, an example will be described in which an input terminal of a filter is disposed close to the circumference of the substrate 50, a matching inductor is disposed close to the center 50c of the substrate 50, and an input terminal of an LNA is disposed close to the center 50c of the substrate 50.

Figure 9:
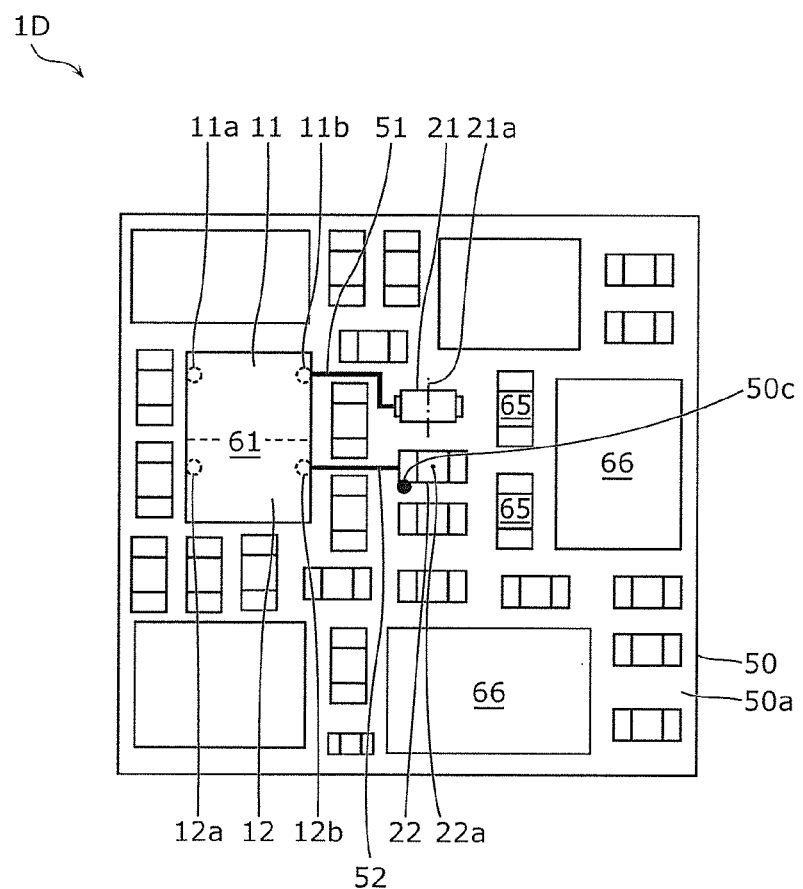
FIG. 9 is a diagram of a front-end module according to a fourth modification of the first preferred embodiment of the present invention when viewed from a side of one main surface of a substrate.
Figure 10:
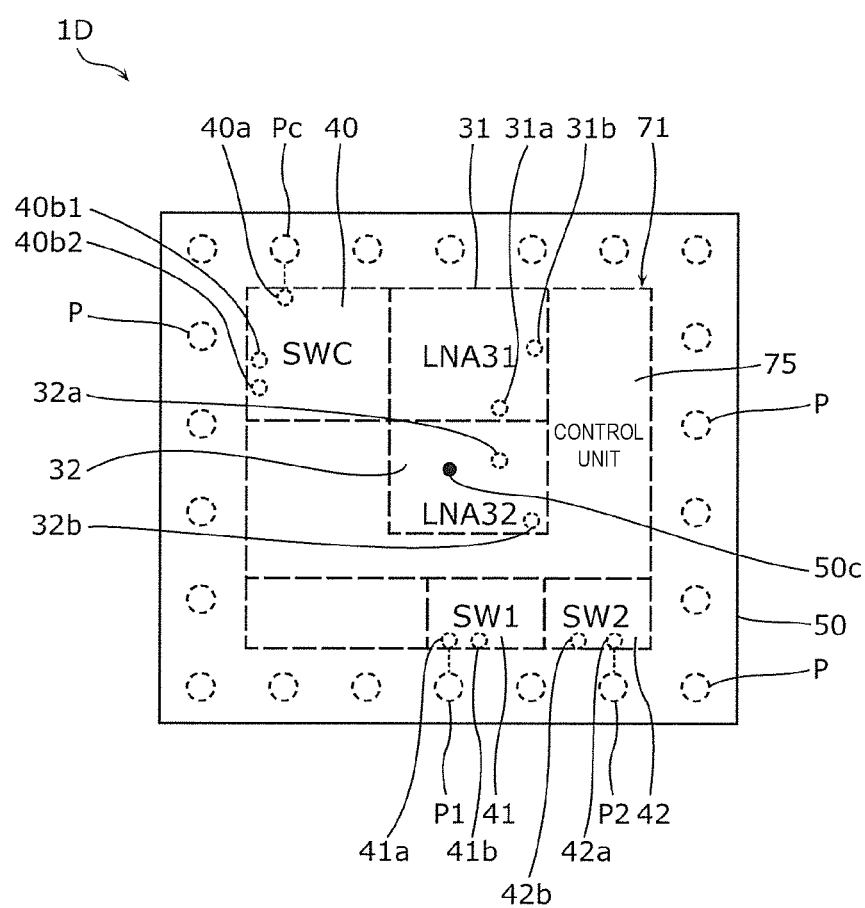
FIG. 10 is a perspective view of an integrated circuit component and an external terminal of the front-end module according to the fourth modification of the first preferred embodiment of the present invention when viewed from the side of the one main surface of the substrate.

FIG. 9 is a diagram of the front-end module 1D according to the fourth modification when viewed from a side of the one main surface 50a of the substrate 50. FIG. 10 is a perspective view of the integrated circuit component 71 and the external terminal P of the front-end module 1D according to the fourth modification when viewed from the side of the one main surface 50a of the substrate 50.

When viewed in a signal path, the front-end module 1D has a structure in which a signal flows in a direction from the circumference of the substrate 50 toward the center 50c on the side of one main surface 50a of the substrate 50, and a signal flows in a direction from the center 50c of the substrate 50 toward the circumference on a side of the other main surface 50b.

Specifically, when the front-end module 1D is viewed from the side of the one main surface 50a of the substrate 50, each of the first inductor 21 and the second inductor 22 is disposed closer to the center 50c than to the circumference of the substrate 50. The first filter 11 is disposed such that the filter input terminal 11a is located closer to the circumference of the substrate 50 than to the filter output terminal 11b is, and the filter output terminal 1ib is located closer to the first inductor 21 than the filter input terminal 11a is. Further, the second filter 12 is disposed such that the filter input terminal 12a is located closer to the circumference of the substrate 50 than the filter output terminal 12b is, and the filter output terminal 12b is located closer to the second inductor 22 than the filter input terminal 12a is.

Further, the first LNA 31 is disposed such that the LNA input terminal 31a is located closer to the center 50c of the substrate 50 (i.e., closer to the first inductor 21) than the LNA output terminal 31b is, and the LNA output terminal 31b is located closer to the circumference of the substrate 50 than the LNA input terminal 31a is. Further, the second LNA 32 is disposed such that the LNA input terminal 32a is located closer to the center 50c the substrate 50 (i.e., closer to the second inductor 22) than the LNA output terminal 32b is, and the LNA output terminal 32b is located closer to the circumference of the substrate 50 than the LNA input terminal 32a is.

According to this structure, respective components mounted on the substrate 50 may be disposed close to each other, and wiring paths between the components may be shortened. In the present modification, while achieving high integration of the front-end module 1D, it is possible to prevent electromagnetic field coupling between the first inductor 21 and the second inductor 22 when the CA is executed.

Second Preferred Embodiment

Next, a circuit configuration of a front-end module 1E according to a second preferred embodiment of the present invention will be described with reference to FIG. 11. In the second preferred embodiment, an example will be described in which the filter component 61 including the first filter 11 and the second filter 12 is configured as a duplexer.

Figure 11:
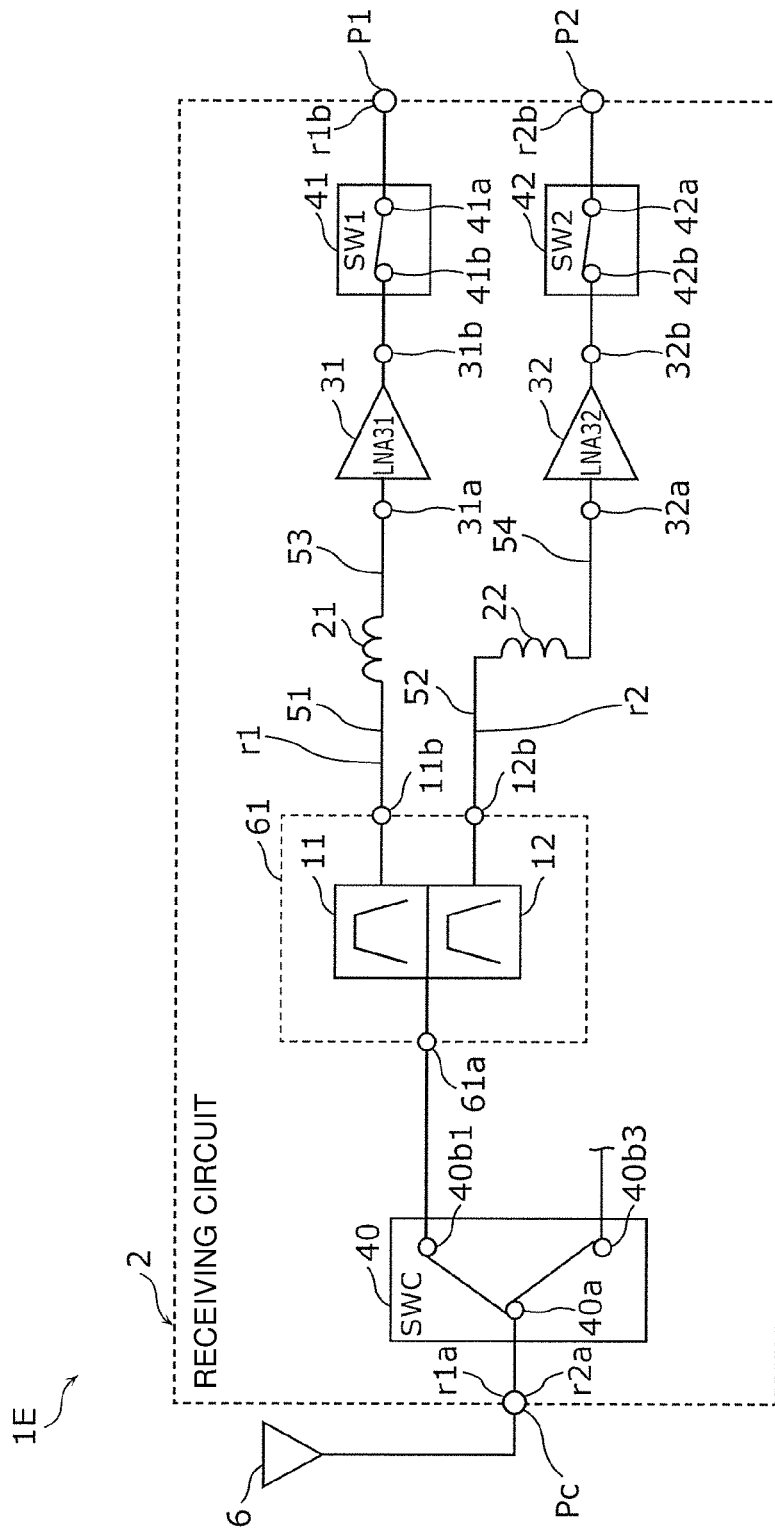
FIG. 11 is a diagram showing a circuit configuration of a front-end module according to a second preferred embodiment of the present invention.

FIG. 11 is a diagram showing a circuit configuration of the front-end module 1E.

The front-end module 1E includes the receiving circuit on which the CA is executed. When the CA is executed, the receiving circuit 2 is inputted with high-frequency signals in a plurality of bands belonging to the same frequency band group.

As shown in FIG. 11, the antenna element 6 is connected to the common input terminal Pc of the front-end module 1E. A signal processing circuit (not shown) is connected to the first output terminal P1 and the second output terminal P2.

The front-end module 1E includes the first path r1 and the second path r2 to which a high-frequency signal is inputted when the CA is executed. The common input terminal Pc is provided at the one end r1a of the first path r1, and the first output terminal P1 is provided at the other end rib of the first path r1. The common input terminal Pc is provided at the one end r2a of the second path r2, and the second output terminal P2 is provided at the other end r2b of the second path r2. The first path r1 and the second path r2 are defined by a common path between the common input terminal Pc and an input terminal 61a of the filter component 61.

On the first path r1, the input side switch 40, the first filter 11, the first inductor 21, the first LNA 31, and the first output side switch 41 are disposed in this order from the common input terminal Pc toward the first output terminal P1.

On the second path r2, the input side switch 40, the second filter 12, the second inductor 22, the second LNA 32, and the second output side switch 42 are disposed in this order from the common input terminal Pc toward the second output terminal P2.

As described above, the first filter 11 and the second filter 12 are configured as a duplexer, for example. The duplexer is a single filter component 61 that includes the first filter 11 and the second filter 12.

The input side switch 40 is disposed between the common input terminal Pc and the first filter 11 on the first path r1, and between the common input terminal Pc and the second filter 12 on the second path r2. The input side switch 40 is preferably, for example, an SPnT switch, and includes the common terminal 40a and a plurality of the selection terminals 40b1 and 40b3.

In the front-end module 1E, the CA is executed, by simultaneously connecting the common terminal 40a and the selection terminal 40b1 of the input side switch 40, connecting the first output side switch 41, and connecting the second output side switch 42.

Also in the front-end module 1E according to the second preferred embodiment, the coil axis 21a of the first inductor 21 and the coil axis 22a of the second inductor 22 are different from each other. With this, when the CA is performed in the front-end module 1E, it is possible to prevent electromagnetic field coupling between the first inductor 21 and the second inductor 22.

Third Preferred Embodiment

Figure 12:
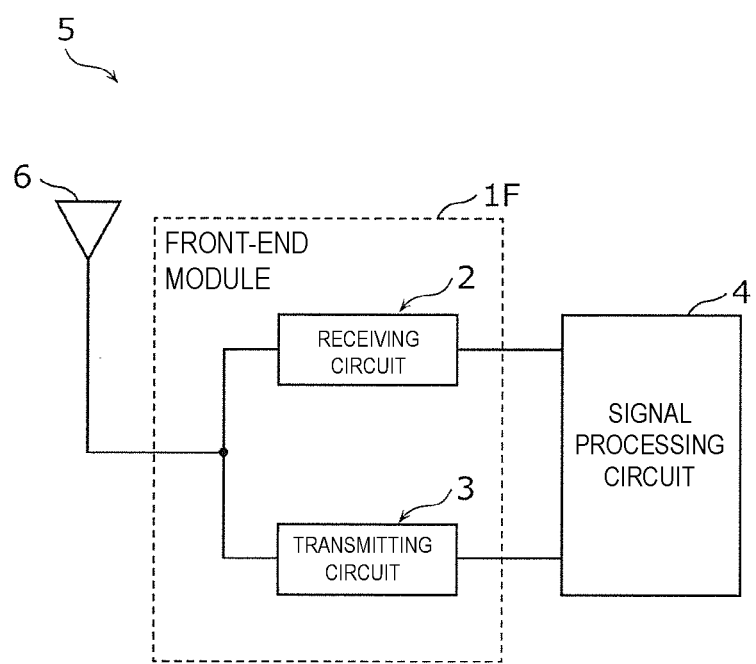
FIG. 12 is a diagram showing a circuit configuration of a communication device according to a third preferred embodiment of the present invention.

Next, a communication device 5 according to a third preferred embodiment of the present invention will be described with reference to FIG. 12. FIG. 12 is a diagram showing a circuit configuration of the communication device 5 according to the third preferred embodiment.

The communication device 5 according to the third preferred embodiment includes a front-end module 1F and a signal processing circuit 4.

The front-end module 1F includes the receiving circuit 2 according to the first or second preferred embodiment, and a transmitting circuit 3. The transmitting circuit 3 includes, for example, a band pass filter and a power amplifier. The receiving circuit 2 and the transmitting circuit 3 are connected to the antenna element 6 with wiring extending from the receiving circuit 2 and the transmitting circuit 3 interposed therebetween.

The signal processing circuit 4 is preferably, for example, an RFIC, and is connected to each of the receiving circuit 2 and the transmitting circuit 3. The signal processing circuit 4 processes a signal outputted from the receiving circuit 2 of the front-end module 1F, and a signal inputted to the transmitting circuit 3 of the front-end module 1F.

The front-end module 1F according to the present preferred embodiment further includes the transmitting circuit 3.

Since the front-end module 1F is provided with the receiving circuit 2 in which the characteristic deterioration is prevented as described above, it is possible to prevent characteristic deterioration in the front-end module 1F including the transmitting circuit 3.

Further, the communication device 5 according to the present preferred embodiment includes the front-end module 1F, and the signal processing circuit 4 processing a signal outputted from the front-end module 1F and a signal inputted to the front-end module 1F.

Since the front-end module 1F is provided with the receiving circuit 2 in which the characteristic deterioration is prevented as described above, it is possible to improve communication quality of the communication device 5 including the front-end module 1F.

While the front-end modules and communication devices according to the preferred embodiments of the present invention have been described above, the present invention is not limited to the individual preferred embodiments. Without departing from the spirit and scope of the present invention, the preferred embodiments to which various modifications that are conceived by those skilled in the art are applied, or configurations provided by combining elements in different preferred embodiments may be included in the scope of one or more of the aspects of the present invention.

Although in the above-described preferred embodiments, an example is described in which the first LNA 31, the second LNA 32, the input side switch 40, the first output side switch 41, and the second output side switch 42 are defined by the single integrated circuit component 71, the present invention is not limited thereto. For example, each of the first LNA 31, the second LNA 32, the input side switch 40, the first output side switch 41, and the second output side switch 42 may be defined by a separate integrated circuit component.

In the above-described preferred embodiments, an example is described in which the first filter 11 and the second filter 12 are defined by the single filter component 61, but the present invention is not limited thereto. For example, each of the first filter 11 and the second filter 12 may be defined by a separate filter component.

In the above-described preferred embodiments, an example is described in which the integrated circuit component 71 is mounted on the other main surface 50b of the substrate 50, and the filter component 61 is mounted on the one main surface 50a of the substrate 50, but the present invention is not limited thereto. For example, the integrated circuit component 71 may be incorporated into the substrate 50. Further, the filter component 61 may be incorporated in the substrate 50.

In the above-described preferred embodiments, an example is described in which the input side switch 40, the first output side switch 41, and the second output side switch 42 are provided on the signal path of the front-end module, but the input side switch 40, the first output side switch 41, and the second output side switch 42 need not necessarily be provided.

In the above-described preferred embodiments, the laminated chip inductor is exemplified as the first inductor 21 and the second inductor 22, but the present invention is not limited thereto. Each of the first inductor 21 and the second inductor 22 may be a wire-wound inductor provided by winding a wire. Each of the first inductor 21 and the second inductor 22 may be defined by a device in which a plurality of inductors are integrated, such as an integrated passive device (IPD).

In addition, in the third modification of the first preferred embodiment, an example is described in which the portion of the region of the ground electrode 55a is removed below the second inductor 22, but the present invention is not limited thereto. For example, a portion of a region of the ground electrode 55a may be removed below the first inductor 21.

FIGS. 13A and 13B are diagrams showing a portion of the substrate 50 and the first inductor 21 of a front-end module according to another preferred embodiment. FIG. 13A is a perspective view of the ground electrode 55a and the first inductor 21 when viewed from a side of the one main surface 50a of the substrate 50, and FIG. 13B is a sectional view of FIG. 13A.

As shown in FIGS. 13A and 13B, when the front-end module is viewed from the side of one main surface 50a of the substrate 50, the ground electrode 55a located closest to the one main surface 50a of the substrate 50 among a plurality of the ground electrodes 55 and 55a, includes an electrode pattern shape that does not overlap with the first inductor 21. Specifically, a region of the ground electrode 55a, facing a region on the substrate 50 on which the first inductor 21 is mounted, is removed.

In the front-end module shown in FIGS. 13A and 13B, one or more ground electrodes 55 and 55a parallel or substantially parallel to the one main surface 50a of the substrate 50 are provided inside the substrate 50. When the front-end module is viewed from the side of one main surface 50a of the substrate 50, the ground electrode 55a located closest to the one main surface 50a of the substrate 50 among the one or more ground electrodes 55 and 55a, includes an electrode pattern shape that does not overlap with the first inductor 21.

Even when the coil axis 21a of the first inductor 21 is parallel or substantially parallel to the ground electrode 55a, since the ground electrode 55a includes the electrode pattern shape that does not overlap with the first inductor 21, it is possible to prevent a magnetic field generated by the first inductor 21 from being blocked by the ground electrode 55a. Thus, deterioration in Q characteristics of the first inductor 21 is able to be prevented, and characteristic deterioration in the front-end module is able to be prevented.

The front-end modules and the communication devices of preferred embodiments of the present invention may be widely used as a component of an electronic device, such as a personal digital assistant, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A front-end module, comprising:
  a substrate; and
  a receiving circuit that is provided in or on the substrate and in which carrier aggregation (CA) is executed; wherein
  the receiving circuit includes:
    a first path and a second path to which a high-frequency signal is inputted when the CA is executed;
    a first filter disposed on the first path to filter the high-frequency signal;
    a first low noise amplifier (LNA) disposed on the first path to amplify a signal filtered by the first filter;
    a first inductor provided on the first path between the first filter and the first LNA to perform impedance matching for the first filter and the first LNA;
    a second filter disposed on the second path to filter the high-frequency signal;
    a second LNA disposed on the second path to amplify a signal filtered by the second filter; and
    a second inductor provided on the second path between the second filter and the second LNA to perform impedance matching for the second filter and the second LNA; and
  a coil axis of the first inductor and a coil axis of the second inductor are different from each other.

2. The front-end module according to claim 1, wherein the first inductor is mounted on one main surface of the substrate such that the coil axis of the first inductor is parallel or substantially parallel to the one main surface of the substrate; and
  the second inductor is mounted on the one main surface of the substrate such that the coil axis of the second inductor is perpendicular or substantially perpendicular to the one main surface of the substrate.

3. The front-end module according to claim 1, wherein the first inductor and the second inductor are disposed adjacent to each other on one main surface of the substrate.

4. The front-end module according to claim 2, further comprising:
  a plurality of external terminals provided on another main surface of the substrate; wherein
  the first filter and the second filter are mounted on the one main surface of the substrate; and
  the first LNA and the second LNA are mounted on the other main surface of the substrate.

5. The front-end module according to claim 4, wherein the plurality of external terminals include a common input terminal provided at one end of the first path and at one end of the second path that is in common with the one end of the first path, a first output terminal provided at another end of the first path, and a second output terminal provided at another end of the second path; and
  the receiving circuit further includes:
    an input side switch disposed on the first path between the common input terminal and the first filter, and, on the second path between the common input terminal and the second filter;
    a first output side switch disposed on the first path between the first LNA and the first output terminal; and
    a second output side switch disposed on the second path between the second LNA and the second output terminal.

6. The front-end module according to claim 1, wherein the first filter and the second filter are included in a single filter component; and
  the first LNA and the second LNA are included in a single integrated circuit component.

7. The front-end module according to claim 1, wherein each of the first inductor and the second inductor is a chip component.

8. The front-end module according to claim 1, wherein each of the first inductor and the second inductor has a rectangular or substantially rectangular parallelepiped shape; and
  the first inductor and the second inductor are mounted such that an axis along a longitudinal direction of the first inductor and an axis along a longitudinal direction of the second inductor are parallel or substantially parallel to each other.

9. The front-end module according to claim 1, wherein on the first path, wiring connecting the first inductor and the first LNA is shorter than wiring connecting the first filter and the first inductor; and
  on the second path, wiring connecting the second inductor and the second LNA is shorter than wiring connecting the second filter and the second inductor.

10. The front-end module according to claim 1, wherein one or more ground electrodes parallel or substantially parallel to one main surface of the substrate are provided inside the substrate; and
  when the front-end module is viewed from a side of the one main surface of the substrate, a ground electrode located closest to the one main surface of the substrate of the one or more ground electrodes includes an electrode pattern shape that does not overlap with the second inductor.

11. The front-end module according to claim 1, wherein
one or more ground electrodes parallel or substantially parallel to one main surface of the substrate are provided inside the substrate; and
when the front-end module is viewed from a side of the one main surface of the substrate, a ground electrode located closest to the one main surface of the substrate of the one or more ground electrodes includes an electrode pattern shape that does not overlap with the first inductor.

12. The front-end module according to claim 1, wherein in the receiving circuit, when high-frequency signals in a plurality of bands belonging to an identical frequency band group are simultaneously inputted, the CA of the plurality of bands is executed.

13. The front-end module according to claim 12, wherein the frequency band group is a frequency band of about 1.8 GHz or more and about 2.2 GHz or less.

14. The front-end module according to claim 12, wherein the frequency band group is a frequency band of about 2.3 GHz or more and about 2.7 GHz or less.

15. The front-end module according to claim 12, wherein the frequency band group is a frequency band of about 3.3 GHz or more and about 5 GHz or less.

16. The front-end module according to claim 12, wherein the plurality of bands are Band 3 and Band 1 in 3GPP, or Band 3 and Band 66 in the 3GPP.

17. The front-end module according to claim 12, wherein the plurality of bands are Band 40 and Band 7 in 3GPP.

18. The front-end module according to claim 12, wherein the plurality of bands are Band 25 and Band 66 in 3GPP, Band 2 and Band 4 in the 3GPP, or Band 2 and Band 66 in the 3GPP.

19. The front-end module according to claim 12, wherein the plurality of bands are Band 30 and Band 41 in 3GPP.

20. The front-end module according to claim 12, wherein the plurality of bands are Band 77 and Band 79 in 3GPP, Band 42 and Band 79 in the 3GPP, or Band 78 and Band 79 in the 3GPP.

21. The front-end module according to claim 1, further comprising a transmitting circuit.

22. A communication device, comprising:
the front-end module according to claim 21; and
a signal processing circuit to process a signal outputted from the front-end module and a signal inputted to the front-end module.

* * * * *